United States Patent [19]

Guazzo

[11] Patent Number: 4,516,830
[45] Date of Patent: May 14, 1985

[54] JUNCTION FOR JOINING THE ENDS OF TWO UNDER WATER OPTICAL FIBER CABLES, AND METHOD OF MANUFACTURE

[75] Inventor: Lucien Guazzo, Calais, France

[73] Assignee: Les Cables de Lyon, France

[21] Appl. No.: 453,868

[22] Filed: Dec. 28, 1982

[30] Foreign Application Priority Data

Dec. 30, 1981 [FR] France .................. 81 24514

[51] Int. Cl.³ .................. G02B 5/14; G02B 5/16
[52] U.S. Cl. ............... 350/96.22; 350/96.20; 350/96.21; 350/96.23; 174/68 R; 174/70 R; 174/72 C
[58] Field of Search ............ 350/96.23, 96.15, 96.20, 350/96.21, 96.22, 96.10; 174/50, 50.5, 68 R, 70 R, 70 S, 72 A, 72 C, 84 C, 116

[56] References Cited

U.S. PATENT DOCUMENTS

| | | | |
|---|---|---|---|
| 3,936,143 | 2/1976 | Sato | 350/96.21 |
| 3,944,327 | 3/1976 | Larsen | 350/96.21 |
| 4,081,208 | 3/1978 | Meade | 350/96.20 |
| 4,227,770 | 10/1980 | Gunn | 350/96.23 |
| 4,261,644 | 4/1981 | Giannaris | 350/96.21 |
| 4,278,835 | 7/1981 | Jackson | 350/96.23 |
| 4,333,706 | 6/1982 | Davis et al. | 350/96.23 |
| 4,371,234 | 2/1983 | Parfree et al. | 350/96.23 |
| 4,373,777 | 2/1983 | Borsuk et al. | 350/96.23 |
| 4,412,878 | 11/1983 | Guazzo | 350/96.15 |
| 4,422,321 | 12/1983 | Müller et al. | 350/96.20 |
| 4,422,889 | 12/1983 | Trezeguet et al. | 350/96.23 |

FOREIGN PATENT DOCUMENTS

| | | | |
|---|---|---|---|
| 0034286 | 8/1981 | European Pat. Off. | 350/96.23 |
| 2847384 | 5/1980 | Fed. Rep. of Germany | 350/96.23 |
| 3006131 | 9/1981 | Fed. Rep. of Germany | 350/96.21 |
| 2431713 | 2/1980 | France | 350/96.21 |
| 2438277 | 4/1980 | France | 350/96.21 |

Primary Examiner—William L. Sikes
Assistant Examiner—Brian M. Healy
Attorney, Agent, or Firm—Sughrue, Mion, Zinn, Macpeak, and Seas

[57] ABSTRACT

A junction for joining the ends of two under water optical fiber cables, each cable comprising an optical core (1, 1') inside a protective arch of helically wound steel wires (2, 2'), with a copper tube (3, 3') swaged down on the arch, and an insulating outer sheath (4, 4') covering the copper tube, then a return conductor (14, 14') of aluminum, and an outer insulating protective covering (16, 16'). The junction comprises two cable-receiving end portions (8, 8') for receiving respective ends of the two cables to be joined, and a central portion (5, 6) for interconnecting said end portions. The end portions provide mechanical connection to their respective cable ends and are themselves mechanically interconnected by an outer metal tube (6). The optical fibers (22) are stripped to leave a considerable amount of slack. They are inserted into the ends of a mandrel (5) and then threaded out through holes near its ends for end to end joining with corresponding fibers in the other cable. The joins are protected by individual sleeves (26) and the slack is taken up by winding the fibers around the mandrel. The mandrel is held fast against axial movement or rotation relative to the end portions (8, 8'). The outer layers of the cable are reconstituted around the junction as described above.

16 Claims, 6 Drawing Figures

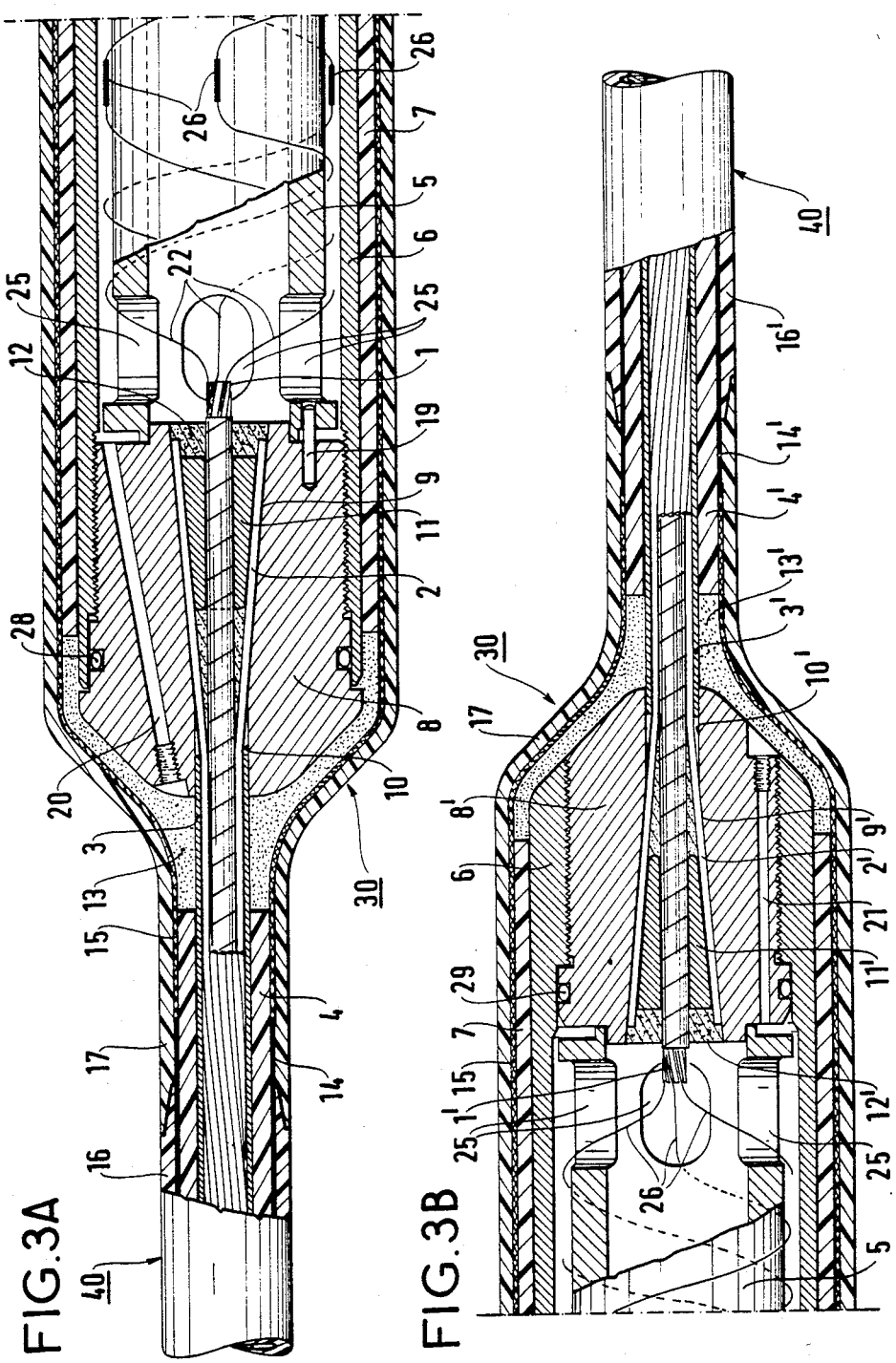

JUNCTION FOR JOINING THE ENDS OF TWO UNDER WATER OPTICAL FIBER CABLES, AND METHOD OF MANUFACTURE

FIELD OF THE INVENTION

The present invention relates to a junction for joining the ends of two under water optical fiber cables, each cable comprising an optical core inside a protective arch of helically wound steel wires, with a copper tube swaged down on the arch, and an insulating outer sheath covering the copper tube, the junction comprising two cable-receiving end portions for receiving respective ends of the two cables to be joined, and a central portion for interconnecting said end portions, wherein each end portion comprises:

an anchor member at least partially made of high strength metal, said anchor member having an axially extending cable-receiving bore passing therethrough, said bore having a conically flared portion at a cable-exit end, and a cylindrical portion at a cable-insertion end, said cylindrical portion having a diameter suitable for receiving the end of a cable stripped down to its copper tube; and a cable-retaining conical wedge member fitted in the conical portion of the anchor member bore, the outer conical surface of the wedge member being suitable for co-operating with the conical surface of the anchor member bore to wedge the steel wires of the cable when splayed out between said conical surfaces, a setting synthetic resin being suitable for filling voids between and around the steel wires, said wedge member further having an axial bore suitable for passing the optical core of the cable through to the central portion of the junction.

The invention also relates to a method of joining two optical fiber cable ends using such a junction, the method including the following steps:

(a) the ends of the cables are stripped to bare lengths of their optical fibers which are considerably longer than the length of the final junction;

(b) the outer sleeves, if any, the outer tube, and the anchor members are engaged in that order over the ends of the cables;

(c) the arch-forming steel wires, the copper tubes and the outer sheaths of the cables are cut to suitable lengths;

(d) a quantity of setting resin is inserted into the conical bores of the anchor members and the steel wires are splayed out in the conical bores;

(e) the conical wedge members are inserted to wedge the steel wires in the anchor members, and voids between and around the steel wires are filled with setting resin, and the resin is set.

Junctions of this nature are used either to interconnect the ends of two lengths of cable during cable laying, or else to repair a cable which has been damaged.

BACKGROUND OF THE INVENTION

Generally speaking, under water optical fiber cables comprise: a core including the optical fibers which are themselves either placed in tubes of plastics material filled with viscous material or else in helical grooves around a metal or plastic core member; a protective arch of steel wires wound helically around the core; a longitudinally welded tube of ductile metal (e.g. aluminum or copper) swaged down on the steel wires; and an insulating sheath of thermoplastics material such as polyethylene.

It is difficult to interconnect the ends of cables made in this manner, since all the following need to be achieved at once by the junction:

the optical fibers of the cables need to be connected end to end (usually by welding), and enough slack optical fiber must be left to avoid breakage in the event of traction being applied to the cable;

the structural protective arches of steel wires on the two ends must be mechanically joined with sufficient strength to withstand the traction to which the cable is subjected during handling; and the junction must be watertight, even against the pressures to be found at the bottoms of the oceans.

One prior proposal for a junction to meet the above requirements rationally and rapidly when there are two cable ends to be joined uses an inner optical fiber supporting member which is free to move axially and to rotate. This can lead to the fibers being broken in the event of operator clumsiness.

Preferred embodiments of the present invention avoid this drawback and provide a junction which is simple to use and which is: mechanically strong; watertight by means of a filling of water repelling material; and well insulated electrically.

SUMMARY OF THE INVENTION

The junction of the present invention comprises the following improvement:

the central portion of the junction comprises:

an inner mandrel for mounting connections between individual pairs of optical fibers and an outer tube for mechanically interconnecting the anchor members, the mandrel being received, when the junction is assembled, inside the outer tube between the anchor members, and means being provided to prevent the mandrel from rotating or moving axially relative to the anchor members;

the mandrel being open at both ends to receive the optical fiber cores of the cables to be joined where they leave the axial bores of the wedge members, and having a plurality of fiber passing holes through its wall near each end thereof suitable for enabling optical fibers from each of the cores to be brought to the outside surface of the mandrel and to be wrapped therearound after end-to-end connection with corresponding optical fibers from the other core; and the outer tube being made of a high strength metal, having a bore that leaves a clearance around the mandrel, having means for fastening said anchor members to each end thereof, and being covered in a layer of insulating material suitable for continuing the insulating outer sheaths of the cables by means of closure mouldings of thermoplastics material cast over the ends of the anchor pieces after the junction has been used to interconnect two cables.

Advantageously the mandrel abuts against the anchor members, whereby it is prevented from moving axially relative thereto.

The mandrel and the clearance between the mandrel and the outer tube may be filled with a viscous material such as polyisobutylene.

Preferably the anchor members are provided with filler orifices to enable the viscous material to be injected into the junction after assembly of the anchor members in the outer tube, one of said orifices serving to inject the viscous material and the other serving to vent air displaced by the viscous material.

In one embodiment the conical wedge member is in the shape of two cones placed end to end and meeting at their bases. In which case, the junction may further include a copper ring suitable for holding the ends of the steel wires around the optical core where the core leaves the cable exit end of the bore through the wedge member.

The junction may further include two outer sleeves made of synthetic material, and already made known by a prior proposal.

The method according to the invention comprises the improvement defined by the following steps:

(f) the optical fibers to be joined end to end are threaded through the end openings of the mandrel and then out through its fiber passing holes, and the mandrel is then put in place between the anchor members;

(g) the optical fibers are interconnected end to end and the surplus length of optical fiber is wrapped around the mandrel;

(h) the outer tube is placed over the mandrel and fixed at its ends to the anchor members;

(i) the inside of the mandrel and the clearance between the mandrel and the outer tube is filled via filler orifices provided through the anchor members; and (j) the closure mouldings are cast over the ends of the anchor members and the adjacent portions of cable.

Preferably a viscous material such as polyisobutylene is used in said filling step (i), and then said filler orifices may be plugged by screw-threaded plugs before the step (j) of casting the closure mouldings.

Advantageously the method includes a final step of covering the entire junction by means of two outer sleeves of synthetic material.

BRIEF DESCRIPTION OF THE DRAWINGS

An embodiment of the invention is described by way of example with reference to the accompanying frawings, in which:

FIG. 3A is an axial section on a larger scale than FIG. 3 of the portion of FIG. 3 to the left of a line X—X;

FIG. 3B is an axial section on a larger scale than FIG. 3 of the portion of FIG. 3 to the right of the line X—X.

MORE DETAILED DESCRIPTION

Figure 1:
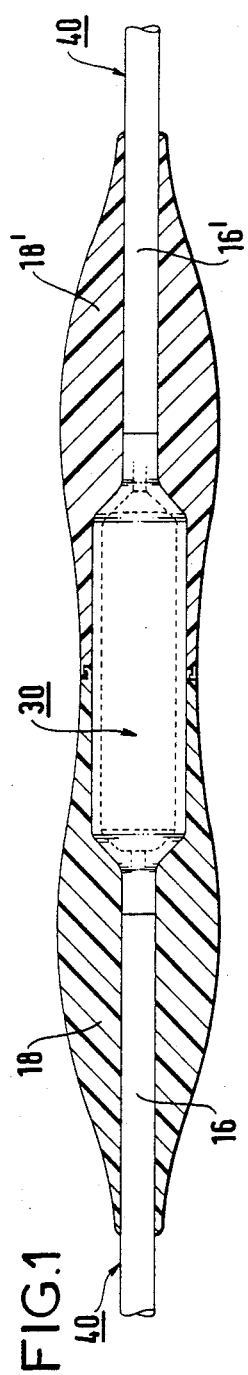
FIG. 1 is a partial section through two cable ends joined together using a junction in accordance with the invention.

FIG. 1 shows two outer sleeves 18 and 18' which completely cover a junction 30 in accordance with the invention.

Figure 2:
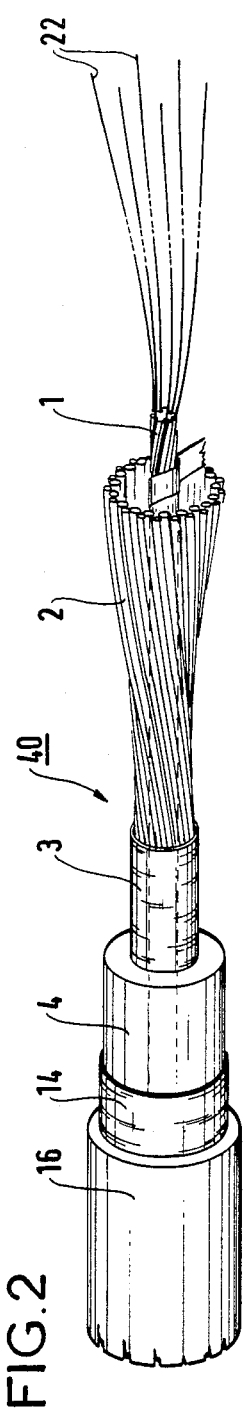
FIG. 2 is a perspective view of the end of a cable showing its various component parts.

FIG. 2 shows the end of a cable 40 comprising optical fibers 22 on an optical core 1, a protective arch of steel wires 2 wound helically around the core 1, a copper tube 3 serving as a first power supply conductor, an insulating sheath 4, a return power supply conductor 14, and another outer insulating sheath or covering 16.

Figure 3:
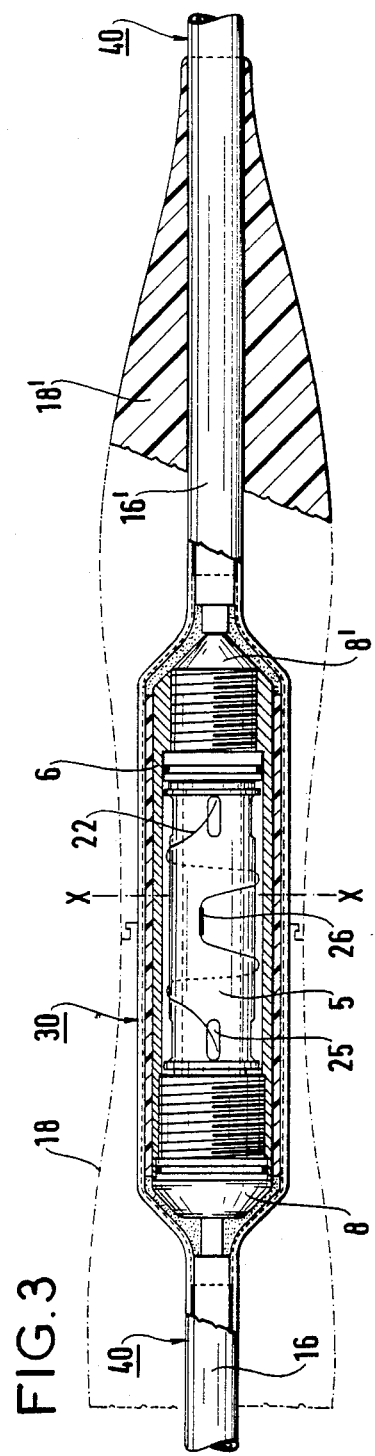
FIG. 3 is a partial section on a larger scale than FIG. 1 showing the main components of the invention.

FIG. 3 shows the inside of the junction 30, and in particular it shows a sleeve 26 protecting an end to end fiber join (usually a weld) and how an optical fiber 22 is wrapped around an inner mandrel 5.

FIGS. 3A and 3B show the junction in greater detail. It comprises a central portion having an inner mandrel 5 disposed around the cable axis. Near each end of the mandrel 5 there are several optical fiber passing holes 25 through the mandrel wall. When the cable ends are being joined, the optical fibers enter the mandrel via respective ends thereof, pass out through the holes 25 and are joined together end to end. The excess length of optical fiber is then taken up by winding the joined fiber ends around the mandrel.

Figure 4:
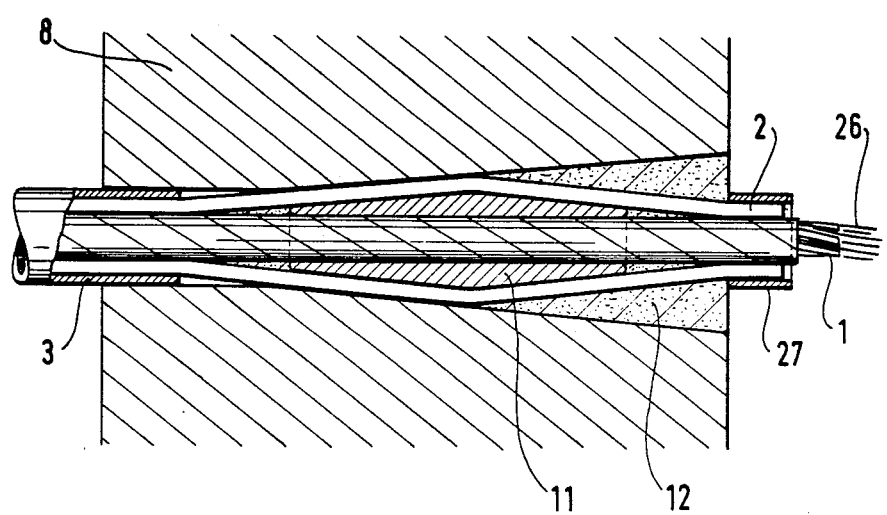
FIG. 4 shows a variant wedge member in the shape of two cones meeting base to base.

A peg 19 prevents the mandrel from rotating, and it is prevented from axial displacement by two anchor members 8 and 8'. Each of the anchor members has an axial bore passing therethrough to receive a respective one of the cables. The bore has a conically flared portion 9 or 9' at a cable exit end and a cylindrical portion 10 or 10' at a cable insertion end. The diameter of the cylindrical portion is suitable for receiving the copper tube 3 of a cable end which has been stripped down to the tube. In the flared portion, the steel wires 2 are splayed out and are wedged in place by a cable-retaining conical wedge member 11 or 11'. The wedge member shown in FIGS. 3A and 3B is in the shape of a single cone, but alternatively it could be in the shape of two cones connected by their bases, as shown in FIG. 4. In the two cone case, a copper ring 27 is used to retain the steel wires on the end of the core 1. It will be observed that the anchor members 8 and 8' are not symmetrical reflections of each other, this is to facilitate assembly and is described in greater detail below.

The voids that remain between the anchor members, the wedge members and the steel wires wedged between the facing conical surfaces thereof is filled with an epoxy resin 12 or 12' which sets on heating and prevents any slippage of the steel wires once they have been wedged in place. The greater part of the outside surface of the anchor members is threaded for screwing into corresponding tapped portions at the ends of an outer tube 6. The outer tube 6 is not symmetrical. To facilitate assembly, the outer tube is initially threaded over the cable to be connected to the anchor member 8', and then once the fibers have been interconnected and the anchor members placed against the ends of the mandrel 5, the outer tube 6 is slid over the anchor member 8' and the mandrel 5 and is then screwed to both anchor members simultaneously.

The anchor member 8 has a filler orifice 20 via which the junction is filled with a viscous material, such as polyisobutylene. The anchor member 8' has a similar filler orifice 21 which is used as an air vent during filling. Both filler orifices are closed by threaded stoppers. Sealing rings 28 and 29 seal the outer tube 6 to the anchor members 8 and 8' both to avoid the viscous material from leaking out and to prevent water from seeping in.

The outer tube 6 has an outer covering 7 of insulating material, and continuity of the insulating sheaths 4 and 4' of the cables and the covering 7 is provided by a closure moulding 13 or 13' of thermoplastic material cast over respective ends of the anchor members and the adjacent lengths of outer tube 6 and cable.

The return conductor 14 is made of aluminum and serves as an electrical ground, thereby protecting personnel working on the cable and also serving as a return path conductor for supplying power to repeaters on the cable. Continuity of the return conductor is ensured by means of an aluminum braid 15 which is glued and/or welded to the insulating material 7.

The outer protective coverings 16 and 16' are interconnected by a sheath 17 of heat shrinkable plastics material.

The two sleeve of synthetic material 18 and 18' cover the entire assembly, and are glued to each other.

The junction described above is assembled as follows:

The ends of the cables to be joined are stripped, leaving the optical fibers 22 extending bare over a length which is considerably longer than the length of the final junction.

The outer sleeves 18 and 18' are then threaded over respective cable ends. Then the heat shrinkable sheath 17, the aluminum braid 15 and the outer tube 6 are threaded, in that order over one of the cable ends. Finally the anchor members 8 and 8' are threaded over respective cable ends.

The steel wires 2 are then cut to leave a length of core projecting beyond the ends of the wires, and the copper tube 3 is cut further back along the cables to leave uncovered lengths of steel wire suitable for wedging in the flared portions of the anchor member bores. Each next layer further out from the core of the cables is also cut back to leave a length of the layer immediately beneath bare for connecting to the corresponding portion of the junction.

The conical portions 9 and 9' of the bores through the anchor members 8 and 8' have a little hot epoxy resin poured in, and then the steel wires 2 and 2' are splayed out. The conical wedge members 11 and 11' are then threaded over the optical cores to wedge the steel wires outwardly against the flared portions of the bores 9 and 9'. The remaining voids between the steel wires and the adjacent conical surfaces are filled with hot epoxy resin (the void may be relatively large if a two cone wedge member as shown in FIG. 4 is used) and the anchor members are heated from the outside to polymerise the epoxy and jam the steel wires firmly in place.

The optical fibers are passed into the mandrel 5 via its ends and they are then passed out again via its holes 25. The mandrel 5 can the be positioned between the anchor members 8 and 8'. The optical fibers are then joined end to end in pairs by welding, with each weld being protected by a sleeve 26 and the slack fiber being wound around the mandrel.

The outer tube is then slid over the assembly and is screwed onto both anchor members 8 and 8' simultaneously. Transverse screws may be provided to prevent the main threads from becoming unscrewed. The inside of the junction as assembled so far is then filled with viscous material such as polyisobutylene. Once filling is complete, the filler orifices 20 and 21 are closed by threaded stoppers.

The end or closure mouldings 13 and 13' are then cast in place. These mouldings ensure continuity of the insulating sheath 4 and 4' of the cables, via the insulating covering 7 on the outer tube 6.

The return conductor 14 is then reconstituted by moving up the braid 15. Likewise the heat shrinkable sleeve 17 is then brought up and heat shrunk to interconnect the two protective coverings 16 and 16'.

To complete the junction, the two outer sleeves 18 and 18' are then brought up into place and they are glued to each other end to end.

I claim:

1. A junction for joining the ends of two under water optical fiber cables, each cable comprising an optical core inside a protective arch of helically wound steel wires, a copper tube swaged down on the arch, and an insulating outer sheath covering the copper tube, the junction comprising two cable-receiving end portions for receiving respective ends of the two cables to be joined and a central portion for interconnecting said end portions, and wherein each end portion comprises:

an anchor member at least partially made of high strength metal, said anchor member having an axially extending cable-receiving bore passing therethrough, said bore having a cable-exit end and a cable-insertion end, a conically flared portion at said cable-exit end and a cylindrical portion at said cable-insertion end, said cylindrical portion having a diameter sized to closely receive the end of a cable stripped down to its copper tube; and a cable-retaining conical wedge member fitted in the conical portion of the anchor member bore, the outer conical surface of the wedge member being configured and sized for co-operating with the conical surface of the anchor member bore to wedge the steel wires of the cable when splayed out between said conical surfaces, a setting synthetic resin filling voids between and around the steel wires, said wedge member further having an axial bore for passing the optical core of the cable through to the central portion of the junction;

the improvement wherein the central portion of the junction comprises:

an inner mandrel mounting connections between individual pairs of optical fibers and an outer tube mechanically interconnecting the anchor members, the inner mandrel being received, when the junction is assembled, inside the outer tube between the anchor members, and means for anchoring said mandrel to at least one of said anchor members to prevent the mandrel from rotating or moving axially relative to the anchor members;

the mandrel being open at both ends and receiving the optical fiber cores of the cables to be joined where they leave the axial bores of the wedge members, at said open ends, said optical fibers from each of the cores passing into respective mandrel at said open ends and through a plurality of radial fiber passing holes through the wall of said mandrel to the outside surface of said mandrel, end-to-end connections joining said optical fibers from each of the cores and said optical fibers at said end-to-end connections being wrapped around the outside of said mandrel after end-to-end connection with corresponding optical fibers from the other core; and the outer tube being made of a high strength metal, having a bore that leaves a clearance around the mandrel, having means for fastening said anchor members to each end thereof, and being covered in a layer of insulating material and closure mouldings of thermoplastics material cast over the ends of the anchor members after the junction has been used to interconnect two cables for continuing the insulating outer sheaths of the cables, such that the optical fibers of the cables are connected end-to-end with enough slack optical fiber to avoid breakage in the event of traction being applied to the cable, the structural protective arches of the steel wires on the two cables are mechanically joined with sufficient strength to withstand the traction to which the cable is subjected during handling, and wherein the junction is watertight even against high pressure at the bottom of the ocean.

2. A junction according to claim 1, wherein the mandrel abuts against the anchor members, whereby it is prevented from moving axially relative thereto.

3. A junction according to claim 1, further including a peg engaged both in the mandrel and in an anchor member, whereby the inner mandrel is prevented from rotating relative to the anchor members.

4. A junction according to claim 1, wherein the mandrel and the clearance between the mandrel and the outer tube are filled with a viscous material such as polyisobutylene.

5. A junction according to claim 4, wherein the anchor members are provided with filler orifices to enable the viscous material to be injected into the junction after assembly of the anchor members in the outer tube, one of said orifices serving to inject the viscous material and the other serving to vent air displaced by the viscous material.

6. A junction according to claim 1, wherein the conical wedge member is in the shape of two cones placed end to end and meeting at their bases.

7. A junction according to claim 6, further including a copper ring holding the ends of the steel wires around the optical core where the core leaves the cable exit end of the bore through the wedge member in the shape of two cones.

8. A junction according to claim 1, wherein each optical fiber cable further includes a return conductor, and wherein the junction includes an outer braid interconnecting the return conductors.

9. A junction according to claim 1, wherein each optical fiber cable further includes an outer protective covering, and wherein the junction includes a heat-shrinkable sleeve ensuring continuity of the outer protective covering.

10. A junction according to claim 1, further including two outer sleeves of synthetic material suitable receiving the rest of the junction and the adjacent ends of the cables.

11. A method of joining two optical fiber cable ends wherein each cable comprises an optical core inside a protective arch of helically wound steel wires, a copper tube swaged down on the arch, and an insulating outer sheath covering the copper tube, a junction for joining the ends of the fiber cables, said junction comprising two cable-receiving end portions for receiving respective ends of the two cables to be joined and a central portion for interconnecting said end portions, and wherein each end portion comprises an anchor member at least partially made of high strength metal, said anchor member having an axially extending cable-receiving bore passing therethrough, said bore having a cable-exit end and a cable-insertion end, a conically flared portion at said cable-exit end and a cylindrical portion at said cable-insertion end, said cylindrical portion having a diameter sized to closely receive the end of a cable stripped down to its copper tube; and a cable-retaining conical wedge member for fitting in the conical portion of the anchor member bore, the outer conical surface of the wedge member being configured and sized for cooperating with the conical surface of the anchor member, the central portion of the junction comprising an inner mandrel for mounting connections between individual pairs of optical fibers and an outer tube for mechanically interconnecting the anchor members, and means to prevent the inner mandrel from rotating or moving axially relative to the anchor members, the mandrel being open at both ends to receive the optical fiber cores of the cables to be joined, having a plurality of fiber passing holes through its wall near each end thereof, the outer tube being made of a high strength metal having a bore that leaves a clearance around the mandrel; said method comprising the following steps:

(a) stripping the ends of the cables to bare lengths of their optical fibers which are considerably longer than the length of the junction;

(b) engaging the outer sleeves, the outer tube, and the anchor members in that order over the ends of the cables;

(c) cutting the arch-forming steel wires, the copper tubes and the outer sheaths of the cables to suitable lengths;

(d) inserting a quantity of setting resin into the conical bores of the anchor members and splaying the steel wires out in the conical bores;

(e) inserting the conical wedge members to wedge the steel wires in the anchor members, and filling voids between and around the steel wires with setting resin, and setting the resin;

(f) threading the optical fibers to be joined end to end through the end openings of the mandrel and then out through its fiber passing holes, and putting the mandrel in place between the anchor members;

(g) interconnecting the optical fibers end to end and wrapping the surplus length of optical fiber around the mandrel;

(h) placing the outer tube over the mandrel and fixing its ends to the anchor members;

(i) filling the inside of the mandrel and the clearance between the mandrel and the outer tube via filler orifices provided through the anchor members with viscous material; and (j) casting the closure mouldings over the ends of the anchor members and the adjacent portions of cable.

12. A method according to claim 11, wherein a viscous material such as polyisobutylene is used in said filling step (i).

13. A method according to claim 11, wherein said filler orifices are plugged by screw-threaded plugs before the step (j) of casting the closure mouldings.

14. A method according to claim 11, wherein the cables include a return conductor and wherein the method includes a step of interconnecting the return conductors by means of a braid.

15. A method according to claim 11, wherein the cables further include an outer protective covering, and wherein the method includes a step of continuing the outer protective covering by means of a heat shrinkable sleeve.

16. A method according to claim 11, further including a final step of covering the entire junction by means of two outer sleeves of synthetic material.

* * * * *